United States Patent
Mills

[19]

[11] Patent Number: 6,131,565
[45] Date of Patent: *Oct. 17, 2000

[54] SOLAR ENERGY COLLECTOR SYSTEM

[75] Inventor: David Mills, Roseville, Australia

[73] Assignee: Stanwell Corporation Limited, Brisbane, Australia

[*] Notice: This patent is subject to a terminal disclaimer.

[21] Appl. No.: 09/331,430

[22] PCT Filed: Dec. 19, 1997

[86] PCT No.: PCT/AU97/00864

§ 371 Date: Jun. 18, 1999

§ 102(e) Date: Jun. 18, 1999

[87] PCT Pub. No.: WO98/28579

PCT Pub. Date: Jul. 2, 1998

[30] Foreign Application Priority Data

Dec. 20, 1996 [AU] Australia ................................ PO 4293

[51] Int. Cl.[7] ........................................................ F24J 2/38
[52] U.S. Cl. ............................................ 126/577; 680/692
[58] Field of Search ........................................ 126/648–655, 126/680–682, 684, 688, 692, 696, 602, 605

[56] References Cited

U.S. PATENT DOCUMENTS

| 3,986,021 | 10/1976 | Hitchcock . | |
|---|---|---|---|
| 4,044,753 | 8/1977 | Fletcher | 126/688 |
| 4,120,282 | 10/1978 | Espy . | |
| 4,137,897 | 2/1979 | Moore | 126/680 |
| 4,223,664 | 9/1980 | Fattor . | |
| 4,474,173 | 10/1984 | Ford | 126/684 |
| 4,602,853 | 7/1986 | Barr | 126/688 |
| 5,309,893 | 5/1994 | Yeomans | 126/690 |
| 5,899,199 | 5/1999 | Mills | 126/577 |

FOREIGN PATENT DOCUMENTS

| 2674592 | 6/1993 | Australia . |
| 1188195 | 6/1995 | Australia . |
| 1737095 | 8/1995 | Australia . |
| 5096295 | 10/1996 | Australia . |
| 0076455 | 1/1983 | European Pat. Off. . |
| 3003962 | 8/1981 | Germany . |

*Primary Examiner*—James C. Yeung
*Attorney, Agent, or Firm*—Ladas & Parry

[57] ABSTRACT

A solar energy collection system which includes n groups (13, 14) of arrayed reflectors (15) and n+1 target receiver systems (10, 11, 12) which represent absorbing surfaces to solar radiation that is reflected by the reflectors (15). The receiver systems (10, 11, 12) are elevated relative to the reflectors (15) and the reflectors are pivotally mounted to support structures (19) in a manner such that they may be positioned angularly to reflect incident radiation ($I_1$, $I_2$) toward one or the other of the receiver systems (10, 11, 12). The collector system is characterized in that a majority at least of the reflectors (15) within each group (13, 14) are arranged to be driven simultaneously to pivot through the same angle (ø), in that the reflectors (15) within each group (13, 14) are arrayed in two sub-groups (21 and 22), and in that a majority at least of the reflectors (15) within the respective sub-group (21 and 22) are oriented permanently toward respective ones of the receiver systems (10, 11, 12).

18 Claims, 3 Drawing Sheets

6,131,565

SOLAR ENERGY COLLECTOR SYSTEM

FIELD OF THE INVENTION

This invention relates to a solar energy collector system and, in particular, to a system which includes receivers which function to absorb solar radiation and reflectors which are arranged to reflect incident solar radiation toward the receivers. The invention is hereinafter described largely in the context of a collector system which employs receivers that incorporate evacuated tube-type collector elements which function to convert the energy content of incident solar radiation into thermal energy and to transfer the thermal energy to heat exchange fluid. However, it will be understood that the invention does have broader application, for example to systems which include receivers in the form of inverted cavity collectors and photovoltaic cells.

BACKGROUND OF THE INVENTION

A collector system of the type with which the present invention is concerned is referred to as a Fresnel reflector system and, depending upon its configuration, may be considered as an analogue of a parabolic dish or a linear parabolic trough. When configured as an analogue of a parabolic trough, the collector system comprises receivers which are supported by vertical masts and which are orientated or arrayed to form a linearly extending target. The reflectors are positioned slightly above ground level and are arrayed over an area that is selected to provide reflection of radiation toward the target receivers. The arrayed reflectors are orientated to reflect radiation toward one target, and the reflectors are pivotably mounted and coupled to provide for synchronised single-axis tracking.

The above described Fresnel reflector system permits the use of a large scale target and provides for low construction costs relative to those that would be incurred in equivalent size parabolic trough or dish collector systems. However, a problem that is inherent in the use of ground arrayed reflectors is that shading occurs as a consequence of radiation blockage.

A solution to this problem is disclosed in International Patent Application No. PCT/AU96/00177, dated Mar. 28 1996, lodged in the name of The University of Sydney as assignee of the present Inventor and subsequently assigned to the present Applicant. The referenced International Application has been published under number WO96/30705, and it discloses a collector system which comprises at least one group of arrayed reflectors and at least two target receiver systems associated with the or each group of reflectors. Individual reflectors within the or each group are normally orientated toward one or the other of the associated receiver systems, and at least some of the reflectors within the or each group are pivotable to an extent such that they may be re-orientated to shift the direction of reflected radiation from one to the other of the receiver systems.

In use of the system as disclosed in the referenced publication, a determination is made from time-to-time as to which reflectors should be orientated toward the respective receiver systems for the purpose of minimising shading, and individual reflectors (or sub-groups of the reflectors) are pivoted to meet the orientation requirements.

However, having developed the collector system as disclosed in the referenced International Patent Application in an attempt to achieve optimum collector efficiency, it has since been determined by the Inventor that near-optimum performance may be achieved by establishing two sub-groups of reflectors, by orientating all of the reflectors within the respective sub-groups toward respective ones of the receiver systems, and by pivoting a majority at least of the reflectors through the same angle whilst maintaining orientation of the reflectors within the respective sub-groups toward the respective ones of the receiver systems.

SUMMARY OF THE INVENTION

The present invention may be defined broadly as providing a solar energy collector system which includes at least one group of arrayed reflectors and at least two spaced-apart target receiver systems associated with the or each group of reflectors. The receiver systems are supported above ground level and are elevated relative to the reflectors. The reflectors within the or each group are supported at or above ground level and are pivotably mounted to support structures whereby they may be positioned angularly to reflect incident radiation toward one or the other of the receiver systems, and at least a majority of the reflectors within the or each group are arranged to be driven substantially simultaneously to pivot through the same angle. Also, the reflectors within the or each group are arranged in two sub-groups, and at least a majority of the reflectors within the respective sub-groups are orientated permanently toward respective ones of the receiver systems.

FEATURES OF THE INVENTION

The reflectors within the respective sub-groups may be driven individually or be linked mechanically so as to be pivoted in synchronism with changing angle of incident radiation.

The collector system of the present invention permits the use of a drive system which is simpler than that disclosed in International Patent Application No. PCT/AU96/00177. That is, all or, at least, the majority of the reflectors may be coupled together, and this avoids the complexity that is inherent in a drive system which is required to act on individual reflectors and to effect a shift in the reflected radiation from one receiver system to the other. It is possible that the collector system of the present invention may not always avoid completely the effects of shading, but any reduction in collector efficiency that arises from the existence of some shading is offset by the benefits that flow from the use of a relatively simple reflector drive system.

However, if required, the collector system of the present invention may be constructed to provide for optimum collection efficiency by arranging for a small number of the reflectors to be driven to pivot to such an extent as to change the direction of reflection of incident radiation. That is, the collector system in accordance with the present invention may be configured in one of two different ways:

1. With all of the reflectors (referred to as "angle changing reflectors") being driven to change the angle of reflection whilst the reflectors within the respective sub-groups remain permanently orientated towards respective ones of the receiver systems, or 2. With a majority of angle changing reflectors and, additionally, with a minority of reflectors (referred to as "direction changing reflectors") that are driven to pivot to such an extent as to shift the direction of reflection of radiation from one receiver system to the other.

Also, in some installations it may be appropriate that some reflectors have a fixed orientation and be not pivotable.

When more than two receiver systems are associated with the or each group of reflectors, the receiver systems may be positioned to form the sides (or a portion of each of the sides) of a geometric arrangement. For example, the receiver systems as seen from above may be arranged in the form of a square and the reflectors may be grouped within and/or without the boundary of the square. However, the reflectors forming the or each group preferably are arrayed in rows extending parallel to the receiver systems.

The complete collector system may comprise a single group of reflectors positioned between two spaced-apart substantially parallel receiver systems, or the collector system may comprise two groups of reflectors positioned between three spaced-apart parallel receiver systems, with one of the receiver systems presenting a target to radiation reflected from the two groups of reflectors. This particular configuration may be repeated such that for n reflector groups there will be n+1 receiver systems.

As indicated previously, each receiver system may be constituted by any device that has the capacity to absorb solar radiation and to convert solar energy into a useable form of energy. However, each receiver system preferably comprises a solar-to-thermal energy exchange system and most preferably comprises collector elements through which a heat exchange fluid may be passed and which incorporate a solar selective surface coating. In such an embodiment of the invention the coating will function to convert the energy content of incident solar radiation to thermal energy and conduct the thermal energy to the heat exchange fluid.

As previously stated, the reflectors are located at or above ground level and the receiver systems are elevated relative to the reflectors. The reflectors may be supported upon the ground, or the entire collector system may be supported upon a platform above ground level. Such a platform may comprise a building roof and the platform may be considered as being "ground" to the system. In a particular application of the invention, the system may be mounted to a so-called sawtooth shaped building roof.

The invention will be more fully understood from the following description of a preferred embodiment of a complete solar collector system. The description is provided with reference to the accompanying drawings.

MODES FOR CARRYING OUT THE INVENTION

Figure 1:
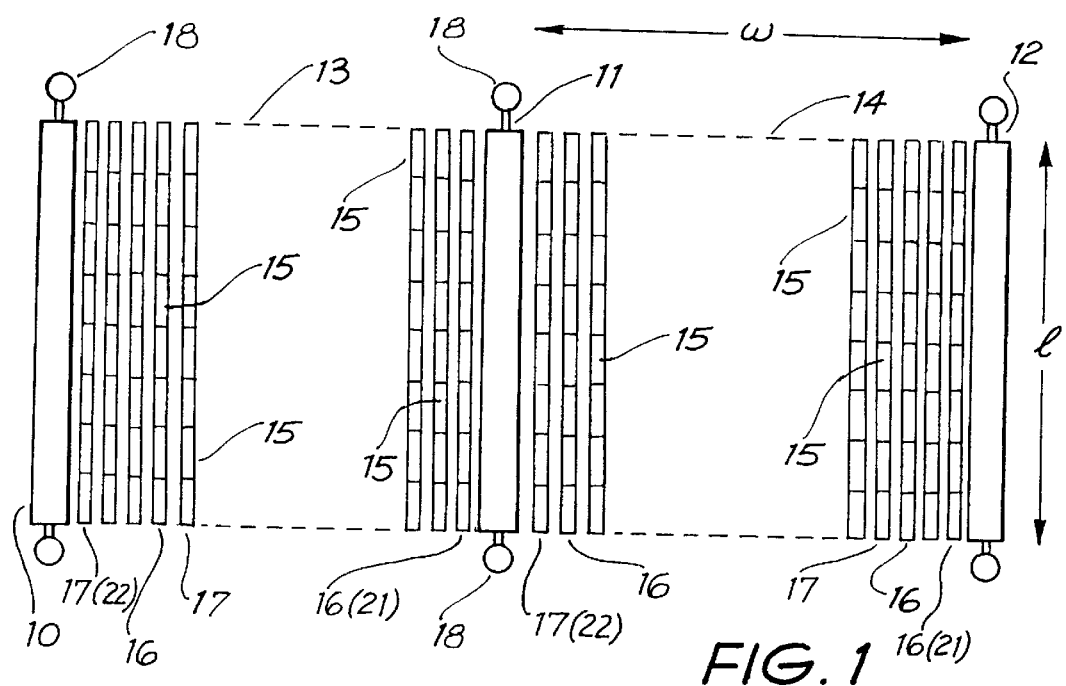
FIG. 1 shows a plan view of the complete collector system incorporating three receiver systems and two groups of reflectors.
Figure 2:
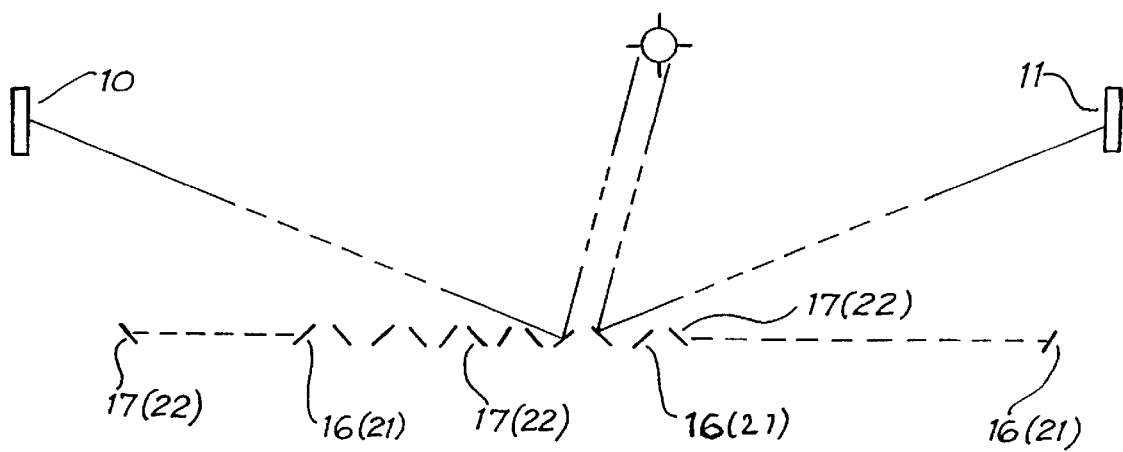
FIG. 2 shows diagrammatically a typical angular disposition of a group of reflectors located between two receiver systems.

As illustrated in FIG. 1, the solar collector system incorporates three spaced-apart, parallel receiver systems 10, 11 and 12 which are separated by two reflector groups 13 and 14. Each of the reflector groups comprises an array of reflectors 15 positioned in parallel rows 16 and 17, and the reflector groups 13 and 14 are disposed to reflect incident radiation to one or the other of the adjacent receiver systems 10, 11 or 12. That is, as shown in FIG. 2, the reflectors 15 in rows 16 of the first group 13 are orientated to reflect incident radiation to the receiver system 10, whilst those in rows 17 of the first group 13 are orientated to reflect incident radiation to the receiver system 11. Similarly, the reflectors 15 in rows 16 of the second group 14 are orientated to reflect incident radiation to the receiver system 11, whilst the reflectors in rows 17 of the same group 14 are orientated to reflect incident radiation to the receiver system 12.

Figure 4:
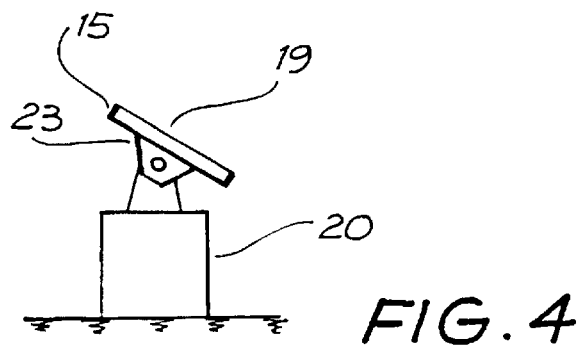
FIG. 4 shows a typical mounting arrangement for one reflector element.

Each of the receiver systems has a length l typically in the order of 250 to 500 meters and each pair of receiver systems will typically be spaced apart by a reflector field width w in the order of 50 meters. With the system having these dimensions the receiver systems will be mounted to masts 18 having a height in the order of 13 meters and the reflectors will provide a ground cover in the order of 50%. The reflectors may be positioned with the center of their reflective surface 19 (FIG. 4) located approximately one meter above the ground, so that the receiver systems are elevated with respect to all of the reflectors, including any that may be located on high points of undulating ground.

All of the reflectors 15 in each of the rows 16 are coupled mechanically, as are all of the reflectors 15 in each of the rows 17. Also, all of the reflectors 15 are mounted to support structures 20 in a manner to permit them to be pivoted through an angle up to approximately 45°, in order that they might:

(a) Adjust progressively for changes in the angle of incident radiation, and (b) If desired, adjust incrementally to ensure that reflected radiation is spread substantially uniformly over the absorbing surface of the receiving systems 10, 11 and 12.

The reflectors 15 in each of the rows 16 may be regarded as forming one sub-group 21 within each of the complete groups 13 and 14, and the reflectors 15 in each of the rows 17 may be regarded as forming a second sub-group 22 within the complete groups 13 and 14. As indicated in FIG. 2, all of the reflectors 15 within the first sub-group 21 of the complete group 13 are orientated permanently toward the receiver 10, and all of the reflectors 15 within the second sub-group 22 are orientated permanently toward the receiver system 11. Similarly all of the reflectors 15 within the first sub-group 21 of the complete group 14 are orientated permanently toward the receiver system 11, and those within the second sub-group 22 are orientated permanently toward the receiver system 12.

As illustrated in FIG. 2 of the drawings, the alternate rows 16 and 17 of the reflectors 15 are positioned and orientated so that blockage of incident and reflected radiation is avoided or, at least, minimised. However, it will be understood that the arrangement shown in FIG. 2 is purely illustrative of one possible arrangement and that different reflector orientations may be appropriate to meet different conditions.

Each reflector 15 may comprise a polished metal or a glass mirror and its reflective surface 19 may be flat or be formed with a slight concentrating curve. In an alternative arrangement, each reflector may be fabricated from a plastics material and be coated or otherwise clad with a reflective surface.

The reflector 15 is itself mounted to a support frame 23 which is carried by an axle that provides for single-axis pivoting of the reflector. The entire reflector assembly is carried by the ground engaging support structure 20, which is dimensioned o support the reflector about 1 meter above the ground and which contains a drive mechanism for the reflector. Each reflector might typically have a length in the order of 2 meters, so that approximately 25 individual reflectors will form a single row 16 or 17 of reflectors.

Figure 5:
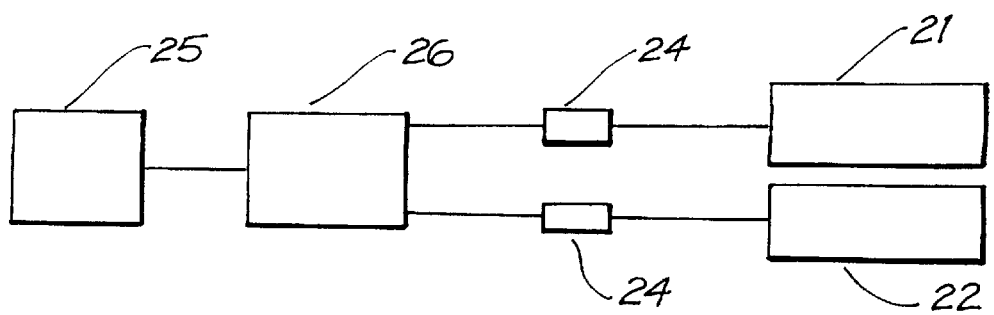
FIG. 5 shows diagrammatically an electrical control system applicable to a group of the reflectors.

As indicated in FIG. 5, a separate drive system is coupled to each of the sub-groups 21 and 22 of the reflectors, and each drive system may comprise a plurality of synchronised tracking motors or stepping motors 24 for imparting uniform angular drive to the rows 16 and 17 of reflectors 15 that form the sub-groups 21 and 22. Drive to the reflectors may be controlled by a sensor 25 which is arranged to detect the position of the sun and to generate appropriate drive signals by way of a processor 26 for the tracking motors 24 that are associated with the reflectors in the respective sub-groups 21 and 22. In an alternative arrangement (not shown), the drive signal may be generated in a microprocessor that is controlled by a computer generated signal that is representative of the position of the sun at periodic intervals.

Figure 3:
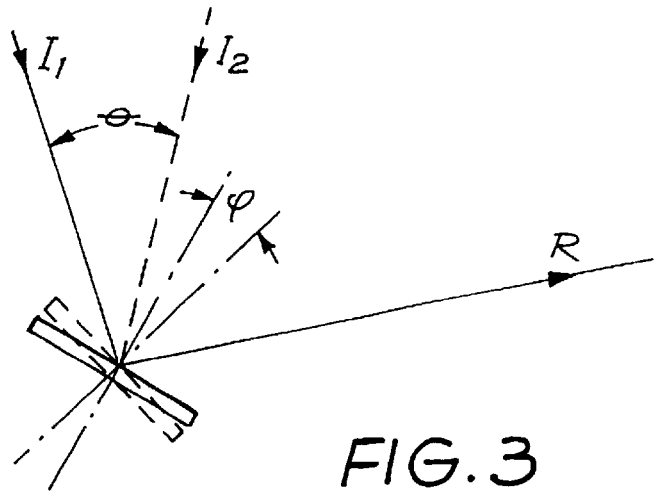
FIG. 3 shows angular dispositions of a single reflector element with changing angle of incident radiation.

As indicated in FIG. 3 of the drawings, because the path of reflected radiation R from the respective reflectors 15 remains constant, drive must be imparted, to the reflectors 15 in a manner to cause all of the reflectors to pivot simultaneously and unidirectionally through an angle ø which is equal to one-half of the change in angle θ of incident radiation I.

Figure 7:
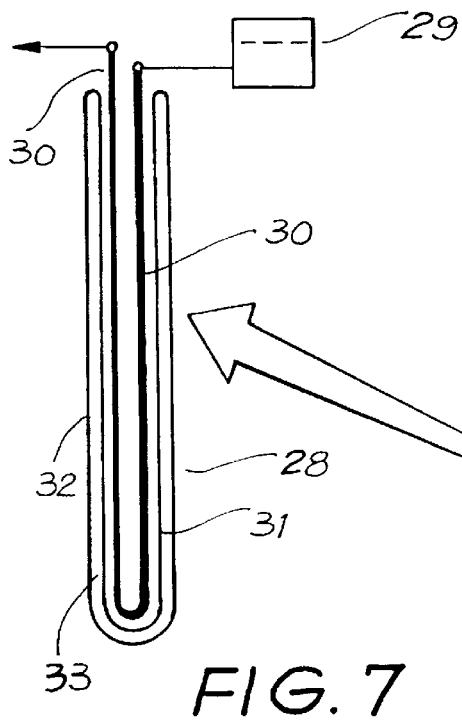
FIG. 7 shows a single collector element removed from the receiver system illustrated in FIG. 5, and FIG. 8 provides a diagrammatic representation in end view of a receiver system which may be employed as an alternative to the receiver system shown in FIG. 6.

Each of the receiver systems 10, 11 and 12 comprises a rack 27 of vertically extending tubular collector elements 28 which have a length in the order of 1.4 meters. The rack 27 mounts all of the collector elements 28 in close spaced relationship and incorporates upper manifolds 29 which, as shown schematically in FIG. 7, are arranged to deliver water to and carry steam from each of the collector elements using a metal U-tube arrangement 30.

The collector elements 28 comprise single-ended glass tubes which have inner and outer tube components 31 and 32 separated by an evacuated space 33. The outer surface of the inner tube 31 is coated with a solar selective surface coating, for example a graded or multi-layer cerment coating upon a bright metal base, which is structured to absorb solar radiation and transmit thermal energy to the heat exchange fluid which is passed through the tube. A metal fin (not shown) may be located within the inner tube component 31 of the collector element to assist in energy transfer from the glass tube to the metal U-tube 30.

Figure 6:
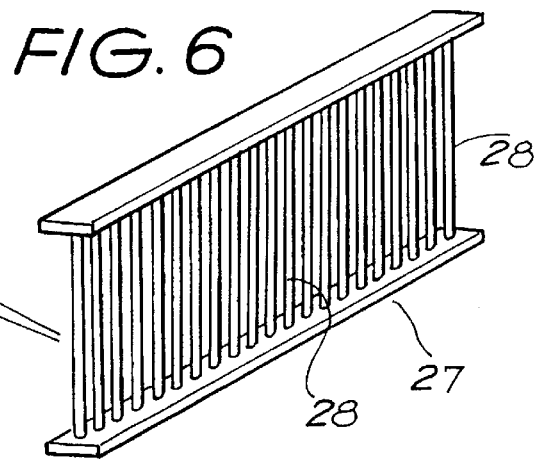
FIG. 6 shows a portion of one of the receiver systems.

Although the collector elements 28 are shown in FIG. 6 as extending vertically between their upper and lower supports, the collector elements may be inclined diagonally at an angle within the range 30° to 60° to the horizontal so as to reduce the effective height of the receiver system. Furthermore, in the interest of enhancing collector efficiency, auxiliary reflector elements (not shown) may be provided to redirect to the collector elements 28 any radiation that might otherwise pass between adjacent collector elements.

Figure 8:
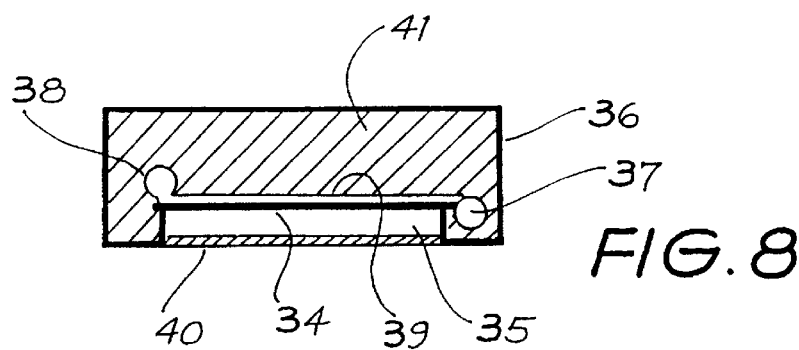

The alternative receiver system as shown in FIG. 8 of the drawings is in the form of an inverted cavity receiver which, as seen in cross-section, comprises a thin metal foil-like plate 34 which is carried above a cavity 35 and within a sheet metal duct 36. Two longitudinally extending manifolds 37 and 38 are supported within the duct 36, the lower one of which is intended to carry water and the upper one of which is intended to carry steam. A plurality of parallel heat exchange tubes 39 extend between and interconnect the manifolds 37 and 38, and the tubes 39 lay in contact with the upper surface of the plate 34.

The under surface of the plate 34 is clad with a solar selective surface coating of the type described previously in the context of the collector elements 28, and a glass panel 40 closes the cavity 35. The cavity s occupied by an inert gas or stagnant air and the interior of the duct 36 is filled with an insulating material 41.

As a further alternative to the receiver system as shown in FIG. 8, the inverted cavity may be replaced by a horizontally disposed array of collector elements of the type which are shown in the vertical array of FIG. 6. Here again auxiliary reflector elements may be provided behind the collector elements to redirect any radiation that might pass between adjacent collector elements. Furthermore, auxiliary reflector elements may be positioned below the aperture presented by the horizontal receiver system for the purpose of directing upwardly into the receiver system any radiation that might otherwise pass below and beyond the receiver system.

Other variations and modifications may be made in the invention as above described and defined in the following claims.

What is claimed is:

1. A solar energy collector system which includes:

a group of reflectors arranged in parallel rows, the reflectors being supported at least at ground level;

two spaced-apart target receiver systems located one at each end of the group of reflectors, the receiver systems being supported above ground level and being elevated relative to the group of reflectors;

support structures pivotally mounting the reflectors, with some reflectors being permanently oriented angularly to reflect incident solar radiation toward one of the receiver systems and other of the reflectors being permanently orientated angularly to reflect incident solar radiation to the other of the receiver systems;

the reflectors in the group being arranged in two sub-groups with a majority of the reflectors in each of the sub-groups being orientated permanently toward a respective one of the receiver systems; and a drive means imparting pivotal movement to the reflectors;

wherein the drive means imparts pivotal movement to at least a majority of the reflectors in the group substantially simultaneously through the same angle to maintain reflection of incident solar radiation toward the receiver systems.

2. The collector system as claimed in claim 1, wherein drive means are provided for individually driving the reflectors within the respective sub-groups through substantially the same angle.

3. The collector system as claimed in claim 1, wherein the reflectors within the respective sub-groups are linked mechanically and wherein drive means are provided for driving the linked reflectors through substantially the same angle.

4. The collector system as claimed in claim 1, wherein all of the reflectors within the or each group are arranged to be driven substantially simultaneously to pivot through the same angle while, at the same time, the reflectors within the respective sub-groups remain permanently orientated toward respective ones of the receiver systems.

5. The collector system as claimed in claim 1, wherein a majority of the reflectors within the or each group comprise angle changing reflectors that are arranged to be driven substantially simultaneously to pivot through the same angle while, at the same time, said angle changing reflectors within the respective sub-groups remain permanently orientated toward respective ones of the receiver system, and wherein a minority of the reflectors within each group comprise direction changing reflectors that are arranged to be driven to pivot to such an extent as to shift their direction of orientation from one receiver system to, another receiver system.

6. The collector system as claimed in claim 1, wherein each receiver system comprises a solar-to-thermal energy exchange system.

7. The collector system as claimed in claim 6, wherein each receiver system comprises at least one rack of arranged collector elements through which a heat exchange fluid is passed in use of the system.

8. The collector system as claimed in claim 7 wherein each collector element comprises a glass tube through the heat exchange fluid is passed in use of the system, the tube having inner and outer walls which define an evacuated space and the inner wall of the tube being coated with a solar selective surface coating.

9. The collector system as claimed in claim 8 wherein the collector tubes extend in a vertical direction between upper and lower support members of the rack.

10. The collector system as claimed in claim 8 wherein the collector tubes extend in a diagonal direction between upper and lower support members of the rack.

11. The collector system as claimed in claim 6 wherein each receiver system comprises at least one inverted cavity type receiver.

12. The collector system as claimed in claim 11 wherein the cavity type receiver includes a horizontally disposed, longitudinally extending absorb plate, a glass panel disposed in parallel relationship to the plate, and a gas-containing cavity separating the plate and the panel, the plate having an undersurface that is exposed to the cavity and which is coated with a solar selective surface coating, and the receiver incorporating heat exchange tubes in contact with an upper surface of the plate.

13. The collector system as claimed in claim 1, wherein two receiver systems are associated with the group of reflectors.

14. The collector system as claimed in claim 13, wherein the reflectors within each group are arranged in linear rows which extend parallel to the receiver systems.

15. The collector system as claimed in claim 14 wherein the reflectors within each row are coupled mechanically and are mounted to support structures in a manner that permits them to pivot in unison.

16. The collector system as claimed 15 wherein a drive control mechanism is coupled with each row of reflectors and arranged to effect pivoting of the reflectors in a manner to adjust for small incremental changes in the angle of incident radiation, whereby radiation reflected from the reflectors is spread substantially uniformly over the absorbing surface of the received system to which the radiation is reflected.

17. The collector system as claimed in preceding claim 1, wherein there are n groups of reflectors and n+1 receiver systems, each group of reflectors being positioned between two receiver systems.

18. The collector system as claimed in claim 1, wherein each reflector is shaped to effect concentration of reflected solar radiation.

* * * * *